United States Patent Office 3,706,525
Patented Dec. 19, 1972

3,706,525
WATER SWOLLEN CELLULOSE DYEING WITH HIGH MOLECULAR WEIGHT DISPERSE DYE IN A GLYCOL ETHER SOLUTION
John Blackwell, Kennett Square, Pa., William Henry Gumprecht, Penns Grove, N.J., and Roy Emerson Starn, Jr., West Chester, Pa., assignors to E. I. du Pont de Nemours and Company, Wilmington, Del.
No Drawing. Continuation-in-part of abandoned application Ser. No. 778,809, Nov. 25, 1968. This application Mar. 8, 1971, Ser. No. 122,227
Int. Cl. D06p 3/82
U.S. Cl. 8—21 C    45 Claims

ABSTRACT OF THE DISCLOSURE

A process for dyeing water swellable cellulosic materials, or mixture or blends thereof with synthetic materials, which process comprises contacting said cellulosic material in any sequence with water in sufficient amount to swell the cellulose, a preformed dye of low water solubility, and a dye solvent which is an ethylene glycol or a polyethylene glycol, e.g. diethylene glycol monomethyl ether, is at least partly miscible with water, and boils above about 150° C. at atmospheric pressure, provided that at some stage during the process the interior of the swollen cellulose is contacted with a solution of the dye in aqueous dye solvent or dye solvent.

CROSS-REFERENCE TO RELATED APPLICATION

This application is a continuation-in-part of application Ser. No. 778,809 filed Nov. 25, 1968 and now abandoned.

BACKGROUND OF THE INVENTION

(1) Field of the invention

This invention is directed to a process for dyeing water swellable cellulosic materials, especially cellulosic fibers, either alone or in blends or mixtures with synthetic materials, especially synthetic fibers, with preformed dyes.

(2) Description of the prior art

The conventional procedures for dyeing water swellable cellulosic materials are represented by the following:

(1) A high molecular weight water insoluble dye is formed within the material, either by reacting two smaller components, as in the formation of an azoic dye by a coupling reaction, or by a chemical reaction which renders insoluble a soluble dye precursor, as in vat and mordant dyeing.

(2) A water soluble preformed dye having an affinity for the cellulosic material is exhausted onto the material from an aqueous solution by a procedure which involves reducing the solubility of the dye in the aqueous solution, as with direct dyes.

(3) A dye containing a substituent which reacts with the cellulose or a modified cellulose may be exhausted onto the material from either an aqueous or non-aqueous solution under conditions such that the dye is chemically bonded to the substrate, as with fiber reactive dyes.

(4) Water insoluble pigments are bonded to the cellulose with polymeric materials, as in pigment printing.

(5) A finely divided form of a water insoluble dye is incorporated into the cellulose during a manufacturing step, as is sometimes done during spinning of viscose rayon.

None of these conventional procedures can be used to dye cellulose by directly introducing into the material a preformed, nonreactive, water insoluble dye since such dyes have little natural affinity for or substantivity to cellulosic materials.

Representative of the aforesaid processes wherein dyes are formed in situ after a precursor is deposited on or within the cellulose are processes disclosed in U.S. Patents 396,692 and 2,069,215 and British Patent 1,071,074. A process employing water soluble preformed dyes for dyeing cellulose is discussed in the Journal of the Society of Dyers and Colourists, 73, 23 (1957).

The use of water insoluble dyes for dyeing cellulose acetate is disclosed in U.S. Patent 2,923,593. However, such substrates are considered in the art as nonswellable in the presence of water and the dyeing thereof is recognized as being unlike the dyeing of water swellable cellulosic materials.

The aforesaid processes suffer from a variety of disadvantages, such as complexity of application, inability to achieve a broad spectrum of colors, and low fastness of the dyed cellulose to aqueous washing and/or dry-cleaning with organic solvents.

The use of dyes of low water solubility for dyeing cotton is disclosed in British Patent 1,112,279. The process involves the application of dye, water and urea or a structurally related compound to the substrate, followed by heating. In such a process dye utilization frequently is poor and undesirable basic degradation products from the urea or related compound may be formed.

Problems in addition to the above are encountered in the use of prior art dyeing processes for blends or mixtures of cellulosic and synthetic materials. Generally, complex two-stage processes are required and the components of the blend or mixture are dyed in separate steps with different dyes. The amounts of dyes required usually are high, with each component undesirably interfering with the dyeing of the other. The complexity of the two-stage process also is apparent from a consideration of the divergency of operating conditions between conventional dyeing processes for cellulosic and synthetic materials. In contrast to the aforesaid procedures for dyeing cellulose, the usual procedures for dyeing synthetic materials are based on dissolution of water insoluble dyes in the synthetic material.

Representative of prior art on the dyeing of blends of cellulosic and synthetic materials employing a two-stage process is U.S. Patent 3,313,590. Analogous to the dyeing of such blends and confirming the aforesaid distinction between swellable cellulosic materials and non-swellable cellulose acetate, U.S. Patent 3,153,563 discloses a two-stage process wherein the cellulose acetate is dyed with a water insoluble dye without coloring the cellulose which then is dyed in an independent step.

The swelling of cotton fibers and other cellulosic materials by water has long been known. Swelling usually is rapid upon contact with water, but it is facilitated by wetting agents and by heat. The swollen materials are enlarged, more flexible, reduced in strength, and otherwise modified in physical and mechanical properties. Because of their open structure, swollen cellulosic materials can be penetrated by and reacted with low molecular weight water soluble compounds. Valko and Limdi in the Textile Research Journal, 32, 331–337 (1962) report that cotton can be swollen with water containing both high boiling, water soluble, nonreactive compounds of limited molecular weight and a crosslinking agent. The water can be removed with retention of swelling and crosslinking can then be effected. The authors suggest that the technique may be useful not only for the introduction into cotton of water soluble reactive materials (crosslinking agents) but also other reactive materials which are insoluble in water but soluble in said high boiling, water soluble, nonreactive compound. A similar technique is described in U.S. Patent 2,339,913 issued Jan. 25, 1944 to Hanford and Holmes. The cellulosic is swollen with water, the water then is replaced with methanol-benzene and finally with benzene, with retention of swelling. A cellulose-reactive material (crosslinking agent) is added as a benzene solution and crosslinking is effected.

OBJECTS AND SUMMARY OF THE INVENTION

It is an object of the present invention to provide a process of dyeing water swellable cellulosic materials which increase in size and flexibility upon exposure to water, at high utilization of dye, continuously if desired, with a colored preformed dye which has limited water solubility and does not require oxidation, reduction, hydrolysis or other chemical modification during the process for development of color or fixation within the water swellable cellulosic material. Another object is to provide a process for dyeing water swellable cellulosic materials in admixture or blended with synthetic materials. Still another object is to provide a process for union dyeing both the cellulosic and synthetic components of a blend or mixture by means of a single dye. Another object is to provide a process for dyeing blends or mixtures of cotton and polyester or cotton and polyamide. A further object is to provide a process for dyeing cotton, regenerated cellulose and paper, particularly paper containing purified wood pulps. A still further object is to provide dyed cellulosic materials, and blends or mixtures thereof with synthetic materials, which are fast to aqueous washing and/or drycleaning with organic solvents. Other objects will become apparent hereinafter.

In summary, the objects of the present invention are achieved by means of a process which comprises contacting a water swellable cellulosic material in any sequence with:

(1) water in an amount sufficient to swell the cellulosic material;
(2) a colored preformed dye, more particularly described below, in an amount sufficient to color the cellulosic material; and
(3) a solvent, more particularly described below, in an amount sufficient to maintain swelling of the cellulose if water is removed;

the amount of water, dye and solvent, the proportion of solvent to water, the order of contact and the contact time, and the temperature being selected so that the cellulosic material is swollen and contacted throughout with a solution of dye in solvent or aqueous solvent, and thereafter fixing the dye within and throughout the cellulosic material and recovering uniformly dyed cellulosic material which is fast to aqueous washing and drycleaning with organic drycleaning solvents.

DETAILED DESCRIPTION OF THE INVENTION

The process of this invention involves swelling the cellulosic material with water or an aqueous solvent, replacing, if necessary, a part or all of the water with a dye solvent while maintaining the cellulosic material in a swollen condition, contacting the interior of the swollen cellulose with a solution of dye in aqueous dye solvent or dye solvent, fixing the dye within and throughout the cellulosic material, and recovering uniformly dyed cellulosic material.

More particularly, the present invention resides in a process which comprises contacting a water swellable cellulosic material in any sequence with the following:

(1) water in an amount sufficient to swell the cellulosic material;
(2) a dye in an amount sufficient to color the cellulosic material, a boiling saturated solution of which dye in 0.1 molar aqueous sodium carbonate exhibits an optical absorbance of 0–2; and
(3) a solvent in an amount sufficient to maintain swelling of the cellulose if water is removed, and which
　(a) is at least 2.5 weight percent soluble in water at 25° C.,
　(b) boils above about 150° C. at atmospheric pressure,
　(c) is a solvent for the dye at some temperature in the range of about 0° to 225° C., and
　(d) has the formula

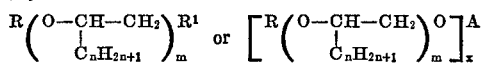

wherein $n$ is 0 or 1;

$m$ is a positive whole number;

R is H, $C_{1-8}$ alkyl, $C_{7-15}$ aralkyl or alkaryl,

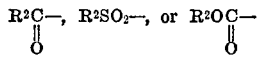

$R^1$ is —OH, —$OR^2$, —$SR^2$, —$NHR^2$, —$NR^2$ ($C_{1-8}$ alkyl), —$NR^2$ ($C_{7-15}$ aralkyl or alkaryl),

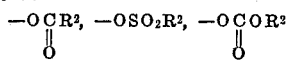

—NH(phenyl), or —NH(naphthyl);

$R^2$ is $C_{1-8}$ alkyl, $C_{5-10}$ cycloalkyl, $C_{7-15}$ aralkyl or alkaryl, $C_6$ aryl, $C_{10}$ aryl, or furfuryl;

$x$ is the number of unsatisfied valencies in A; and

A is $ROCH_2CHORCH_2$—, —$CH_2CHORCH_2$—,

—$CH_2C(CH_2OR)_3$, (—$CH_2)_2C(CH_2OR)_2$, (—$CH_2)_3CCH_2OR$, (—$CH_2)_4C$

—$CH_2(CHOR)_yCH_2OR$,

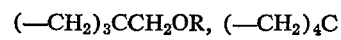

or

in which $y$ is 2, 3 or 4 and $z$ is 0, 1, 2, 3 or 4 but no greater than $y$;

provided that at some stage during the process the interior of the swollen cellulose is contacted with a solution of the dye in aqueous solvent or solvent.

Particular embodiments of the above process include those wherein said solution is formed within and/or outside the swollen cellulose and those wherein solution of dye in aqueous dye solvent or dye solvent is achieved by means of heat, by reducing the proportion of water to dye solvent, or by adding an auxiliary solvent. Embodiments of the above process also include dyeing at elevated temperatures. In all embodiments of this invention the cellulosic material, in its swollen state, is contacted throughout, that is, not only exteriorly but throughout the entire interior regions thereof, with the solution of preformed dye in solvent or solvent-water mixture. After the dye has been distributed uniformly throughout the swollen cellulosic material, it is fixed therein by precipitation. Precipitation of the dye can be effected by obvious means, such as by cooling, by evaporating water and/or solvent, and by extracting solvents by washing and/or scouring with a liquid which preferentially removes dye solvent, that is, without removing substantial amounts of dye.

Even more particularly, the present invention resides in a process for dyeing water swellable cellulosic materials which increase in size and flexibility upon exposure to water, at high utilization of dye, batchwise or continuously, with a colored preformed dye which has limited water solubility and does not require oxidation, reduction, hydrolysis or other chemical modification during the process for fixation or development of color, which process comprises:

(A) Contacting the water swellable cellulosic material in any sequence, including simultaneously, at a temperature of 0–225° C., with:

(1) water in an amount sufficient to swell the cellulosic material;
(2) a colored preformed dye in an amount sufficient to color the cellulosic material, a boiling saturated solution of which dye is 0.1 molar aqueous sodium carbonate exhibits an optical absorbance of 0–2 as calculated from the spectrophotometrically-determined optical absorbance of the solution obtained by diluting the saturated solution ten-fold with a 90/10 mixture, by volume, of triethylene glycol dimethyl ether and water and then cooling to room temperature; and
(3) a solvent as defined above;

(B) While maintaining the cellulosic material from (A) in its swollen state, contacting same throughout with a solution of the preformed dye in solvent or solvent-water;

(C) Fixing said preformed dye throughout the cellulosic material by precipitating same; and (D) Recovering uniformly dyed cellulosic material which is fast to aqueous washing and organic solvent drycleaning.

Still other embodiments of the present invention include a rapid and simplified process of dyeing blends or mixtures of cellulosic and synthetic materials, such as polyamide or polyester, with the same dye. In such a process the cellulose is dyed as described above and the synthetic material is dyed either at the same time or in an independent step of the process.

In dyeing cellulosic materials by the process of this invention, water, dye, and dye solvents can be applied to the substrate in any sequence as long as water and dye solvent are simultaneously present at some stage which is either before or simultaneous with actual dyeing. The preferred method for dyeing fabrics composed of cellulosic fibers or mixtures of cellulosic and synthetic fibers is to impregnate the fabric with a mixture of one or more dyes, water, and dye solvent in a conventional dye padbath followed by squeezing to remove excess dye liquor, or to print with a solvent-containing printing paste, and subsequently heating to evaporate sufficient water to effect dissolution of the dye, at which time the fabric is dyed. Alternatively, water is evaporated, but in an insufficient amount to effect dissolution of the dye, after which pressure and heat are applied to effect dissolution without further evaporation of water. Dyepastes can be prepared by conventional techniques such as by milling the dye in the presence of a dispersing agent or surfactant. A dyebath can be prepared by diluting the dyepaste with water or with aqueous solvent. Addition of a solvent to the dyepaste before addition of water may cause dye separation and usually is avoided. It will be understood by those skilled in the art that additives other than a dye solvent and a dispersing agent can be present in dyebaths. Such additives frequently include migration inhibitors such as purified vegetable gums and wetting agents, examples of which are ionic and nonionic surfactants such as ethylene oxide condensation products, hydrocarbon sulfonates and long-chain alcohol sulfates. Up to about 2 weight percent of an inorganic salt, for example, sodium chloride, can be added to the dyebath to minimize foaming. Dyebaths used in practicing this invention also can contain dyes of a type not required for the practice of this invention; for example, direct dyes or fiber reactive dyes for cotton or for polyamides can be present for shading purposes.

When a single padbath method of application is used to dye cotton fibers or mixtures of cotton and polyester fibers by the process of this invention, the amount of water in the dyebath mixture can range from about 10 to 95 weight percent. At least about 10% water must be present in the dyebath to assure adequate swelling of cotton fibers. About 70 to 95% water is preferred. The maximum amount of water is limited only by the amount of solvent required for effective operation of the process. The amount of dye solvent in the dyebath mixture must be sufficient to maintain the cotton fibers in a swollen state if water is removed. The amount of solvent used is about 5 to 90 weight percent of the dyebath mixture. Preferably, about 5 to 30% solvent is present. Preparation of stable dye dispersions may be more difficult with large amounts of solvent.

Alternatively, any two of the aforesaid three components can be applied simultaneously and the third at a different stage in the dyeing process. For instance, a conventional dispersion of dye in water can be applied in a convenient way, such as by spraying, printing, vacuum impregnation or conventional pad-roll techniques, and the solvent can be applied later in a convenient way, such as by spraying, from the surface of an embossed roll, through a porous screen or roll or by condensation onto the material from a mist or vapor. If desired, the dye can be applied first as a dry powder by electrostatic techniques or by padding or printing a conventional aqueous dye mixture followed by drying to remove water; water and dye solvent then can be applied simultaneously in any convenient way. Similarly, the dye and dye solvent can be applied, followed by application of the water. The dye and dye solvent can be applied by any convenient technique, for example, as a solution of the dye in the hot solvent or as a dispersion of the dye in the cold solvent. Optionally, the dye and/or solvent can be applied as a solution in a low-boiling auxiliary solvent such as a halogenated hydrocarbon boiling below about 130° C. Still further, alternatively, a mixture of water and solvent can be applied, the water removed by heating, and then the dye added as a powder. As the dye dissolves, by heating if necessary, dyeing is effected. Again optionally, the dye can be added as a solution or dispersion in dye solvent, as a solution in an auxiliary solvent, or as an aqueous dispersion.

Also, alternatively, the aforesaid three components can be applied separately. For example, the dye can be applied electrostatically as a dry powder or as a solution in an auxiliary solvent, followed by evaporation of the auxiliary solvent and separate application of the dye solvent and water.

If desired, any one or more of the components can be applied simultaneously with a heating step. For instance, a cold fabric containing dye and dye solvent can be introduced into an oven containing superheated steam; first, water condenses on the fabric (swelling occurs) and, later, excessive water evaporates. As the excess water is removed, the dye dissolves and dyeing occurs. Likewise, a fabric carrying dye and water can be introduced into an oven containing a mist or vapors of a dye solvent. The solvent condenses on the fabric and in so doing heats the fabric; excess water is evaporated and/or the proportion of water to solvent is decreased, the dye dissolves, and the fabric is dyed.

A similar process can be used to dye paper, or the dye can be added to the paper stock using conventional beater techniques. It also has been discovered that the process of this invention can be carried out consecutively a plurality of times, using the one or more of the essential components remaining from the previous operation of the process if desired. For example, multicolor dyeings can be achieved by overprinting a previously dyed substrate.

The amount of water required for effective dyeing by the process of the present invention usually is much less than the amount applied to fabrics by padding with a dyebath as described above. In a typical padbath operation, a pickup of about 70%, based on the weight of fabric, from a padbath containing about 70% water provides fabric with over 50 weight percent water, allowance being made for the equilibrium amount of water usually present in the fabric before padding. The exact amount of water required for swelling cellulosic materials depends on the experimental conditions, but usually ranges from about 10 to 20% of the dry material weight. Since cellulosic materials in equilibrium with air at normal relative humidity may contain only 5% water, additional water usually is required to achieve the necessary swelling. About 20 to 30% water, based on the dry material weight, is preferred. Large amounts of water increase the time and expense required for its evaporation and may result in unwanted dye migration, particularly when drying is effected by application of heat directly to the surface of the fabric.

The amount of dye solvent required for effective dyeing by the process of the present invention depends somewhat on the particular solvent used. More solvent usually is required if excessive amounts are lost during any heating step. The amount of dye retained within the cellulosic substrate after subsequent aqueous and solvent scouring is reduced markedly when the solvent present at the start of said heating step is less than about 3%, based on the weight of dry substrate. Usually, no more than 60% solvent is employed. Optimum fixation of dye within cotton fibers usually is obtained with about 6 to 20% solvent, based on the weight of fibers. When fabrics containing blends of cotton and hydrophobic synthetic fibers are dyed by the process of this invention, less solvent is required. For example, a 65/35 blend of polyester/cotton is efficiently dyed with as little as about 3% solvent based on the weight of dry fabric. Usually, no more than 60% solvent is employed for blends.

The temperature at which dyeing is effected by the instant process depends on the solubility of the dye in the dye solvent or aqueous dye solvent. Some dyes are sufficiently soluble, particularly when an auxiliary solvent is present, that dyeing can be effected at temperatures as low as 0° C. The solubilities of the more useful dyes are usually inadequate for obtaining desired depths of shades at temperatures below about 125° C. Temperatures above about 150° C. are preferred when dyeing cotton. Temperatures of at least about 180° C. are preferred when dyeing mixtures of cotton and polyester fibers to assure rapid and uniform dyeing of the polyester fibers. The maximum useful temperatures are limited only by the adverse effects of high temperatures on the fibers involved. Temperatures not in excess of about 225° C. usually are required to avoid effecting permanent changes in the cotton and/or the synthetic fibers.

Most of the embodiments of this invention involve heating to increase the solubility of the dye, sometimes with evaporation of water. This heating can be carried out in any convenient way, for example, by exposing the fabric to infra-red radiation or to a heated surface, by contacting the fabric with a molten metal bath or superheated steam, or by heating the fabric in a forced-draft, hot gas oven. The heating can be in separate zones or stages to control migration of undissolved dye during initial drying or to effect stepwise dyeing of blended fibers. Equipment similar to that conventionally employed in the well-known Thermosol process is preferred for dyeing continuous lengths of fabrics.

The length of any heating time employed depends on the heating means, dye, and solvent. For example, shorter heating times and lower temperatures are required when the dye dissolves in the solvent at low temperatures and when the heating means raises the temperature of the fabric rapidly, as with infra-red heating and hot can heating. Longer heating times are required with ovens containing static hot air which raises the temperature of the fabric slowly. Appreciable dye fixation can be obtained with heating times as short as one second when there is good contact between fabric and a hot metal surface. Heating times of 30 to 180 seconds are preferred for most embodiments.

It sometimes is convenient and desirable to heat the fabric in two distinct steps when dyeing blends or mixtures of fibers. For example, cotton fibers can be dyed by the process of this invention at a lower temperature than that employed in prior art processes for polyester. Hence, the cotton fibers in a cotton/polyester blend can be dyed herein at a temperature of 175° C. or below without significant dyeing of the polyester fibers. The polyester fibers then can be dyed with the same or a different dye by heating to a temperature of at least about 180° C. Advantage can be taken of this difference in dyeing temperature to reduce fire hazards associated with the more volatile and flammable dye solvents. If desired, the temperature can be held initially at 180° to 225° C. so that both the cotton and polyester can be dyed simultaneously. In another variation of the process, the synthetic fibers in a blend fabric are dyed by heating in the absence of water and/or dye solvent to a temperature of at least about 180° C. and the cotton fibers are thereafter dyed by heating at a lower temperature in the presence of the previously-absent water and/or dye solvent. Such process variations can be used to control the distribution of dye between the cotton and synthetic fibers.

The dyed fibers resulting from the process of this invention can be used without washing or scouring if desired, but inclusion of a scouring step usually is desirable to remove dye adhering to the surface of the fibers. Conventional soaping and scouring procedures, such as those commonly used in vat and azoic dyeing procedures, are adequate with those dyes which are efficiently carried into cotton fibers by this process, but an organic solvent scour sometimes is required with those dyes which are less efficiently utilized. If dyeing is effected without the use of heat and/or substantial amounts of aqueous dye solvent or dye solvent remain, scouring is necessary to achieve fastness to both aqueous washing and drycleaning. The solvents useful in organic solvent scours are preferably solvents in which the dye is highly soluble at moderate temperatures and which do not swell cellulosic fibers. Particularly preferred solvents are tetrachloroethylene and trichloroethylene. Hydrocarbon drycleaning solvents are useful with some dyes.

The cellulosic materials which can be dyed by the process of this invention include all forms of cellulose which increase in size and in flexibility upon exposure to water. Suitable materials include natural fibers and purified wood pulps as well as reconstituted cellulose in fiber and film form. Cotton fibers can be dyed in any of the forms in which they are conventionally used in textile materials and after any of the treatments conventionally used to prepare them for dyeing. Operable materials include cotton which has been treated in any way which does not significantly reduce its swelling upon heating with water; raw or scoured cotton and cotton which has been mercerized or otherwise preshrunk are operable. Reconstituted cellulosic fibers which are sufficiently open in structure so that they are swollen by water and penetrated by a dye solvent are dyeable, for example, cuprammonium rayon. Xanthate viscose rayon normally has a structure which is more difficult to swell and may require exposure to dye, water, and dye solvent for somewhat longer times at lower temperatures. Dyeing of viscose rayon fabric is promoted by the presence of wetting agents, preferably of the nonionic type, which assist penetration of the fibers by the dye solvent. Mixtures of cotton and rayon fibers can be dyed, and the instant process also is operable with purified wood pulp and paper. Excluded herein as the cellulosic material is cellulose acetate which does not exhibit the requisite swellability in the presence of water.

The synthetic materials which can be dyed by the process of this invention in mixtures or blends with cellulosic materials include polyesters, polyamides, cellulose ethers and esters, and copolymers and mixtures thereof with other components intended to make them more easily dyeable or to add other desirable properties. This invention is particularly useful for dyeing mixtures and blends of cotton and polyester or polyamide, such as mixtures containing 65 to 80% polyethylene terephthalate and 20 to 35% cotton. In dyeing the synthetic fibers of such blends, process conditions which are well recognized in the art are used.

The preformed dyes useful in practicing this invention are solid or liquid colored dyestuffs and do not require oxidation, reduction, hydrolysis, or any other chemical modification for development of either color or fastness during their application. The dyes must be sufficiently insoluble in liquids with which the dyed material will come into contact under normal use conditions so that they are not removed from the dyed article during subsequent use. For cotton textiles the dyes must be sufficiently insoluble in hot alkaline washing solutions so they are not removed during subsequent washing. A convenient test for predicting the suitability of a particular dye is to measure its solubility in boiling 0.1 Molar aqueous sodium carbonate. Preferably, it should be essentially insoluble. Visual observation of the color of the supernatant solution after boiling with a small amount of the pure dye usually is adequate to determine if the dye is too soluble, but a quantitative measurement can be obtained by measuring the optical absorbance of a saturated solution by the following procedure.

About 2.5 grams of powdered dye are agitated at reflux in 50 ml. of 0.1 molar aqueous sodium carbonate for one hour and the mixture is filtered through a steam jacketed funnel. The filtrate is reheated to boiling and refiltered through the same funnel. Solids must be present in the funnel to assure saturation of the aqueous solution. The second filtrate is reheated to the boil, 10 ml. are withdrawn in a preheated pipette and diluted to 100 ml. with triethyleneglycol dimethyl ether, and the diluted solution is filtered to remove any flocculent colorless material (sodium carbonate). The optical absorbance of the diluted solution is determined in a unit (1 cm.) cell at the wavelength of maximum absorption of the dye in a Carey recording Spectrophotometer. Absorbance is defined as $$\log_{10}\left(\frac{1}{T}\right)$$

where $$\text{transmittance } T = \frac{\text{radiant power transmitted by sample}}{\text{radiant power incident on sample}}$$

In practice, the absorbance is read directly from the graduated spectrophotometer chart as the height of the absorption peak above the base line. If a longer cell is used, the value obtained from the peak height must be adjusted accordingly. From this, the absorbance of the boiling saturated aqueous solution is calculated assuming Beer's law, that is, by multiplying the measured value by 10.

An equivalent but more convenient method for carrying out the determination is described below.

About 1 gram of powdered dye is heated at reflux in 50 ml. of 0.1 molar aqueous sodium carbonate for one hour. A 10 ml. pipette is inserted into a 6 inch long glass tube which is fitted at the top with a piece of rubber tubing that also fits tightly around the pipette and which is closed at the bottom with a 4–5.5 micron sintered glass filter. The glassware is heated by immersion in the boiling, dye-containing, sodium carbonate solution for 10 minutes. A rubber bulb is fitted to the pipette and 10 ml. of the boiling solution is sucked into it through the sintered glass filter which entraps undissolved solid dye particles. The pipette is removed from the glass tube, the stem is quickly wiped free of liquid and the contents are added to a 100 ml. volumetric flask. The volume is made up to 100 ml. by adding a mixture containing 90% triethylene glycol dimethyl ether and 10% water at room temperature (20–25° C.). The dye remains in solution. A small amount of sodium carbonate may precipitate but this need not be removed since it does not interfere with the determination. The optical absorbance of the diluted dye solution is determined as described above.

In order to obtain reliable results, the dye must be very pure. Colored impurities of higher solubility than the dye itself may produce erroneously high absorbance figures, whereas excessive quantities of inorganic material may inhibit dissolution of the dye and give low absorbance results. It is also important that the dye particles not be so fine that they pass through the filter and dissolve in the aqueous organic solvent system, giving an erroneously high absorbance reading. This situation usually may be corrected by controlled recrystallization of the dye from a suitable solvent before carrying out either of the above procedures.

Useful dyes for textile application exhibit an optical absorbance, measured and calculated as described above, of about 2 or less, that is from 0–2; the preferred dyes exhibit an optical absorbance of less than about 0.2. Use can be made of dyes with a lesser degree of washfastness, however, since washfastness can be improved by after-treatments, for example, by resin treatments which, in addition, may make the fabrics more attractive. If the dyed fabric is given such a resin treatment, the dyes useful in the present invention include those which exhibit optical absorbance values as high as about 30. Dyes exhibiting an optical absorbance as high as about 30 are also useful for dyeing paper since the bleedfastness standards for dyed paper usually are much less stringent than for dyed fabrics.

The optical absorbances of typical preformed dyes, determined by one of the aforesaid procedures, are shown in Table I.

TABLE I.— OPTICAL ABSORBANCE VALUES FOR TYPICAL DYES

| Dye: | Optical absorbance |
| --- | --- |
| 1,4-bis(p-methoxyanilino)-anthraquinone | 0.1 |
| Aminoazobenzene coupled to phenyliminodiethanol dibenzoate | 0.1 |
| C.I. Disperse Orange 44 | 4.1 |
| C.I. Disperse Blue 59 | 9.8 |
| 1-amino - 2 - (3-hydroxybutoxy) - 4 - hydroxy anthraquinone | 18.4 |
| C.I. Disperse Yellow 67 | 141 |
| C.I. Disperse Orange 26 | 310 |

The dyes used in practicing this invention must be soluble in the dye solvent at some temperature in the range of about 0° to 225° C., the latter being the maximum temperature usually employed in the dyeing process so as to avoid permanently damaging the substrate. When dyeing cotton it is preferred that the dye be soluble in the dye solvent at a temperature from about 125° C. to 225° C. Visual observation of the color of a saturated solution of the pure dye in the solvent usually is adequate to determine the suitability of any particular combination of dye and solvent, but quantitative measurements can be obtained. If the optical absorbance of the dye solution is less than about 15, the dye will provide only pastel shades or light tints when used in the process of this invention. In measuring optical absorbance, the procedures previously outlined can be used except that the dye solvent is substituted for 0.1 molar aqueous sodium carbonate and a predetermined dyeing temperature is used for saturating (as opposed to reflux temperature).

As already indicated above, for effective dyeing by the process of this invention, at some stage the dye must be in solution in the interior regions of the cellulosic material under conditions of dyeing. Although this limitation usually is met principally by a consideration of the dye and the dye solvent, it must be recognized that the dyeing process may entail other features which will affect the solubility of the dye. For example, also as noted hereinabove, solution of dye in aqueous dye solvent or dye solvent can be achieved by increasing the temperature, by removal of water so as to increase the proportion of solvent to water, or by adding an auxiliary solvent. Auxiliary solvents will be discussed more fully below. If desired, an evaluation of a dye's usefulness can be made by simulating the dyeing conditions as to temperature and ingredients present within the cellulose. If the dye dissolves to a sufficient extent, it will be operable in the process of this invention.

Dyes which are operable herein generally are of intermediate molecular weight, melting temperature and crystallinity and generally are free of water-solubilizing groups, especially if textiles are being dyed. Many of the conventional disperse dyes which are used to dye synthetic fibersfrom aqueous dyebaths are too soluble in hot water fibers from aqueous dyebaths are too soluble in hot water this invention. Some of these dyes are useful in the instant process for nontextile applications or for textile applications which include an after-treatment to impart fastness to washing. Many other dyes and pigments are not sufficiently soluble in the useful dye solvents for successful use in this invention. For instance, although many vat dyes with large and complicated structures are insoluble in water in their colored or oxidized form, they also are insufficiently soluble in the useful dye solvents to be introduced into cotton fibers by this process. Most lakes and many pigments are likewise insufficiently soluble in the useful dye solvents.

Dyes having suitable solubility properties for use herein can be selected from any of the conventional dye classes such as azo, anthraquinone, indigoid, thioindigoid and phthalocyanine dyes. Suitable anthraquinone dyes include amino-substituted anthraquinones and such condensed ring derivatives of anthraquinone as the pyridinoanthraquinones and benzacridones. Azo dyes generally are more soluble in the preferred solvents and build up to heavier shades; they are a preferred class. Typical suitable azo dyes are obtained by reaction of a diazonium compound with a substituted derivative of acetoacetanilide, phenol, naphthol, aminonaphthol, aniline, 2 - hydroxynaphthoic acid or phenylmethylpyrazolone. Bisazo dyes, also can be used. The preferred dyes for dyeing blends of cotton and polyester by this invention include the aqueous alkali insoluble members of the classes of dyes which were developed particularly for dyeing polyester fibers by high temperature processes, such as the well known thermosol process.

The presence of the dye within a cellulosic material dyed by the process of this invention can be detected by suitable microscopic techniques.

Dye solvents found to be especially useful in this invention:

(a) are at least 2.5 weight percent soluble in water at 25° C.;
(b) boil above about 150° C. at atmospheric pressure;
(c) are solvents for the dye at some temperature in the range of about 0° to 225° C.; and
(d) have the formula

as defined hereinbelow.

One of the aforesaid classes of solvents includes glycols and derivatives of glycols having the structure:

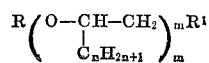

in which
$n$ is 0 or 1,
$m$ is a positive whole number,
R is selected from the class consisting of H, $C_{1-8}$ alkyl, $C_{7-15}$ aralkyl or alkaryl, $R^2C-$, $R^2SO_2-$, and $R^2OC-$,
                                              $\parallel$         $\parallel$
                                              $O$                  $O$ $R^1$ is selected from the class consisting of $-OH$, $-OR^2$, $-SR^2$, $-NHR^2$, $-NR^2$ ($C_{1+8}$ alkyl), $-NR^2$ ($C_{7-15}$ aralkyl or alkaryl), $-OCR^2$, $-OSO_2R^2$, $-OCOR^2$
$\parallel$              $\parallel$
$O$                       $O$ $-NH(phenyl)$, and $-NH(naphthyl)$, and
$R^2$ is selected from the class consisting of $C_{1-8}$ alkyl, $C_{5-10}$ cycloalkyl, $C_{7-15}$ aralkyl or alkaryl, $C_6$ aryl, $C_{10}$ aryl, and furfuryl.

A particularly preferred class of solvents is the above in which $n$ is 0 and $m$ is 2 to 25.

For example, when $n$ is 0, $m$ is greater than 1, R is H, and $R^1$ is $-OH$ in the above formula, the solvents are polyethylene glycols which are available as articles of commerce in various molecular weights and molecular weight ranges. Triethylene glycol and polyethylene glycol of average molecular weight 600 are representative of such glycols.

Similarly, when $n$ is 0, $m$ is greater than 1, R is $C_{1-8}$ alkyl, and $R^1$ is $-OH$ in the above formula, the solvents are alkyl ethers of polyethylene glycols and when R is H and $R^1$ is $-OC-R^2$
$\parallel$
$O$ the solvents are esters of polyethylene glycols. The preferred solvent members of these classes are the methyl ethers and acetate esters, as well as diethers, diethers, and ether esters, such as methoxy diethylene glycol acetate.

Beta-phenoxyethanol is an example of a useful solvent of the above class in which $n$ is 0, $m$ is 1, R is H, and $R^1$ is $-OR^2$ wherein $R^2$ is $C_6$ aryl.

Solvents of the above formula in which $n$ is 1 and $m$ is greater than 1 are polypropylene glycols or derivatives of polypropylene glycols. Because of the lower water solubilities of the polypropylene glycols and their derivatives, the preferred solvents of this class are of lower molecular weight than the corresponding polyethylene glycols and derivatives. Typically, $m$ is 4 to 12.

Suitable solvents of the above types which contain both ethylene glycol and propylene glycol moieties in their structures are also commercially available. Such solvents can be made by processes involving condensation of varying amounts of ethylene oxide with polypropylene glycols of various molecular weights, optionally with later conversion to esters or other chemical derivatives.

Other suitable solvents of the above types are reaction products of alkylene oxides with phenols, aryl amines, mercapto compounds, and sulfonic acids. Typical useful solvents of this type include products of the reaction of about ten moles of ethylene oxides per mole of phenol, aniline, thiophenol, naphthol, or sodium p-toluene sulfonate. Still other suitable solvents can be obtained by reaction of a polyglycol, such as a polyethylene glycol of about 600 average molecular weight, with one or two chemical equivalents of a compound such as ethyl chloroformate or methane sulfonyl chloride.

The other of the aforesaid classes of solvents for use herein includes a group of completely water-miscible compounds having the structure

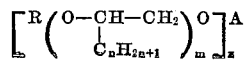

in which $x$ is the number of unsatisfied valencies in A;
A is selected from the group consisting of $$ROCH_2CHORCH_2—$$

$$—CH_2CHORCH_2—$$

$$—CH_2\overset{|}{C}HCH_2—$$

$$—CH_2C(CH_2OR)_3, (—CH_2)_2C(CH_2OR)_2,$$

$$(—CH_2)_3CCH_2OR$$

$$(—CH_2)_4C, —CH_2(CHOR)_yCH_2OR,$$

$$—CH_2(CHOR)_yCH_2—$$

and $—CH_2(CHOR)_{y-z}(—CH)_zCH_2—$ in which $y$ is 2, 3, or 4 and $z$ is 0, 1, 2, 3, or 4 but no greater than $y$; and $n$, $m$ and R are as defined above.

Many examples of compounds of this class are articles of commerce currently used primarily as polyol components in the production of urethane rubbers and foams. Representative are reaction products of alkylene oxides with glycerol, trimethylol propane, pentaerythritol, and sorbitol, for example, those with average molecular weight of about 500. Such reaction products further modified by treatment with agents reactive toward their hydroxyl groups are also useful solvents in the subject dyeing process so long as they retain adequate water solubility. Exemplary solvents of this type can be obtained by reaction of sorbitol with ethylene oxide to obtain a product with an average molecular weight of about 600, followed by treatment with methyl chloroformate or acetic anhydride to react with up to about one half of the hydroxyl groups present.

The preferred solvents within this second class of solvent are polyols, and ether and ester derivatives thereof, wherein $n$ is zero and $m$ is no greater than 25.

In dyeing by the process of this invention, it generally is preferred that the dye solvent be completely miscible with water at 25° C. and at least under dyeing conditions. Particularly in padbath operations, the use of completely water miscible solvents simplifies preparation of the dyebath and assures penetration of the fabric and uniform dyeing. That complete miscibility is not required is borne out by the fact that β-phenoxyethanol is a satisfactory solvent when emulsified in a padbath even though it is soluble in water only to the extent of about 2.5 weight percent at 25° C. It, also, is a satisfactory dye solvent when sprayed onto a fabric already containing dye and water. Dye solvents with water solubilities less than about 2.5 weight percent at 25° C. generally give lower degrees of dye fixation.

The boiling point of the solvent should be sufficiently high so that water can be removed from the cellulosic material by evaporation without excessive loss of solvent. Solvents boiling above about 150° C. at atmospheric pressure have been found to be satisfactory in this respect. It must be kept in mind that solvents boiling as high as about 300° C. undergo a significant amount of evaporation in most of the embodiments of the present process. However, solvent evaporation is not essential and many non-volatile solvents are useful herein.

It has been mentioned above that auxiliary solvents can be employed in the process of the present invention. Such solvents do not meet the requisites of the dye solvents and merely represent an optional material which can be present at some stage of the process. Auxiliary solvents are halogenated hydrocarbons boiling below about 130° C. at atmospheric pressure and include trichloroethylene, tetrachloroethylene, methyl chloroform, methylene chloride and 1,1,2-trichloro-1,2,2-trifluoroethane. They have been found particularly useful in providing a means for introducing the dye in a dissolved form and, also, in the formation of the dye/water/dye solvent or dye/solvent solutions.

Representative examples which illustrate the invention and demonstrate its superiority over prior art processes are given below. Parts are by weight unless otherwise indicated. Optical absorbances (O.A.) were determined by the method described herein. "A.I." refers to active ingredient.

EXAMPLE 1

(A) Pigment Yellow 1, Colour Index 11680, O.A. 1.1, was prepared by coupling Diazo Component 8, C.I. 37110, and acetoacetanilide and milled by well-known procedures. A cotton fabric was padded to about 75% pickup on weight of fiber with an aqueous dispersion containing a sufficient amount of the combined dye filtrate and washings to provide a dye concentration of 12.5 grams per liter, 20 grams per liter of a dispersant condensation product of a long-chain alcohol and ethylene oxide, and 150 ml. per liter of diethyleneglycol diacetate, B.P. 250° C., as a dye solvent. The padded cloth was heated for three minutes in a forced air draft oven maintained at a temperature of 185 to 195° C.; a substantial amount of solvent was retained by the cloth. It then was scoured for about 20 minutes at about 90° C. in water containing 20 grams per liter of the dispersant condensation product of long-chain alcohols and ethylene oxide. A bright yellow dyeing was obtained.

(B) The same dyebath and procedure were used to dye a blend fabric containing 65 parts poly(ethyleneterephthalate) fibers and 35 parts cotton fibers. A solid bright yellow shade was obtained with both types of fiber dyed.

Both the above fabrics showed a slight loss of dye on scouring, which indicated that the major amount of the dye was in the fibers, but showed a slight dry crock, which indicated the presence of some dye on the surface of the fibers. The cotton fabric rated 4–3W in a No. 3 wash test (Method 61–1962 of the American Association of Textile Chemists and Colorists), and 4DW after 40–60 hours in a lightfastness test (Method 16A–1964 of the American Association of Textile Chemists and Colorists). The polyester-cotton fabric rated 5–4W in the wash test and 4DW after 10–20 hours in the lightfastness test.

The same dyebath and the same procedure were used to dye other cotton and polyester-cotton fabrics except that the padded fabrics were heated for three minutes in a 205° C. oven (again, substantial amounts of solvent were retained by the fabric), and the fabrics were scoured with 2% oleate soap at the boil. The scouring removed 6.6% (93.4% fixation) of the dye from the cotton fabric. No. 3 wash ratings of the cotton and polyester-cotton fabrics were 2W and 4–3W, respectively.

EXAMPLE 2

The procedure of Example 1A was used to dye cotton fabric with dyes and variations of dyeing conditions shown in Table II. Three scouring procedures were used:

(a) as in Example 1A;
(b) agitating in 2% sodium oleate solution at 80° to 90° C. for 20 to 30 minutes; and
(c) vigorous washing with soap and hot water.

Satisfactory dyeings were obtained; the degree of dye fixation was high, as judged by the shade of the fabric before and after scouring.

TABLE II

| Dyeing | Dye composition | O.A. | Color of dyeing | Dye solvent Amount, percent | Dye solvent Composition | Heating conditions B.P., °C. | Heating conditions Time, minutes | Heating conditions Temperature, °C. | Scour conditions |
|---|---|---|---|---|---|---|---|---|---|
| 2A | Vat Red 40 C.I. 68300 | 0.2 | Red | 15 | Acetoxyethoxydiethyleneglycol | 218 | 1 | 175 | b |
| 2B | Vat Orange 5 C.I. 73335 | 0.1 | Orange | 10 | Acetoxyethoxydiethyleneglycol | 218 | 2 | 175 | b |
| 2C | (3-chloro-4-nitro-6-methylaniline, Azoic component 7 C.I. 37565) | 0.6 | Red | 20 | Triethyleneglycol diacetate | 300 | 2 | 190 | b |
| 2D | 4-aminobenzacridone | 1.5 | Greenish-blue | 15 | Diethyleneglycol diacetate | 250 | 3 | 195 | a |
| 2E | (Vat Orange 7, C.I. 71105) | 0.1 | Red-brown | 10 / 5 | Diethyleneglycol diacetate / Triethyleneglycol diacetate | 250 / 300 | 2 | 200 | b |
| 2F | (Aminoazobenzene, Azoic component 2 C.I. 37505) | 0.5 | Wine red | 13.3 / 6.6 | Diethyleneglycol diacetate / Triethyleneglycol diacetate | 250 / 300 | 2.5 | 200 | c |
| 2G | Diazo component 5 C.I. 37125, acetoacet-o-anisidine | 0.1 | Yellow | 15 | Diethyleneglycol diacetate | 250 | 2 | 200 | c |
| 2H | do | 0.1 | do | 5 | Methoxypolyethylene glycol, MW 350 | | 2 | 200 | c |
| 2I | do | 0.1 | do | 15 | Triethyleneglycol dimethyl | 300 | 2 | 200 | c |
| 2J | Pigment Orange 6 C.I. 12730 | 2.2 | Orange | 15 | Diethyleneglycol diacetate | 250 | 3 | 195 | a |
| 2K | Vat Red 10 C.I. 67000 | <2 | Red | 10 | Triethyleneglycol diacetate | 250 | 2 | 200 | c |
| 2L | 5-anilino-1, 9-N-phenylanthrapyridazone | 1.1 | Red | 10 | do | 250 | 2 | 200 | c |
| 2M | 4-anilino-2-phenyl anthrazapyridine | 0.3 | Brown | 10 | do | 250 | 2 | 200 | c |

As in Example 1, substantial amounts of solvent were retained by the fabrics before scouring despite the elevated temperature oven treatment. In some cases, over 95% of the original amount of solvent remained.

EXAMPLE 3

Dyes and procedures described in Table II, Examples 2B, 2E, 2G, 2H, 2I and 2J were used to dye a 65/35 blend fabric of polyester-cotton. Solid shades were attained; both components were dyed. As in Example 2, substantial amounts of solvent were retained by the fabric, at least in the cotton portion thereof, throughout the oven treatment.

EXAMPLE 4

Vat Blue 2, C.I. 73045, O.A. 0.5, dyed both components of a 65/35 blend of poly(ethyleneterephthalate) and cotton fibers a light blue shade when applied by the procedure of Example 1. Again, at least the cotton portion of the blend retained a substantial amount of solvent throughout the oven treatment.

EXAMPLE 5

(A) Cotton jean cloth was padded at a 70%, on weight of fiber, pickup with a mixture comprising 2.5% Pigment Yellow 1, C.I. 11680, O.A. 1.1, 2.77% gum tragacanth, 0.55% of a nonionic surfactant condensation product of long-chain alcohols and ethylene oxide, 10% by volume diethyleneglycol diacetate, and water. The fabric was passed continuously through a hot air Thermosol oven maintained at temperatures between about 175° C. and about 220° C. at speeds providing heating times within the oven between about 90 and about 180 seconds. A substantial amount of solvent was retained by the cloth. Portions of the fabric were they scoured for 15 minutes with 2% oleate soap solution at the boil and other portions were scoured with tetrachloroethylene. Bright yellow dyeings of good quality and high dye fixation were obtained.

(B) Similar dyeings were obtained when similarly-padded fabrics were passed continuously through ovens containing infra-red heaters or heated roller cans. Again, substantial amounts of solvent were retained by the fabrics throughout the heat treatment.

EXAMPLE 6

Cotton fabric was padded with an aqueous dispersion comprising 20 g./l. of a yellow dye, prepared by coupling Azoic Component 13, C.I. 37595, O.A. 0.1, to acetoacet-o-anisidine. After drying, the fabric was padded with a solution containing 90% by volume diethyleneglycol diacetate and 10% by volume water. The padded cloth was heated for three minutes at 207° C. (a substantial amount of solvent was retained) and scoured in an aqueous 2% sodium oleate solution at 90° C. A bright yellow dyeing was obtained.

EXAMPLE 7

Cotton broadcloth was padded at 100% pickup with an aqueous dispersion comprising 80 g./l. of Pigment Yellow 1, C.I. 11680, O.A. 1.1, and 10 g./l. of a long-chain alcohol condensation product with ethylene oxide. The fabric was allowed to dry and parts of it were impregnated with a mixture of water with one of the solvents listed below. The solvent concentration was 33% by volume in one series and 67% by volume in a second series.

Solvent: Boiling point, ° C.
  Methoxy triethyleneglycol acetate _____ 244
  Diethyleneglycol n-butyl ether acetate _____ 246

The fabric was heated three minutes at 210° C., scoured with soap-water at the boil for 15 to 20 minutes, and washed with water. Areas which had been impregnated with the solvent-water mixtures were bright yellow, the rest of the fabric was only stained. Substantial amounts of solvent were retained by the fabric throughout the heat treatment.

EXAMPLE 8

The dye having an O.A. of 0.2 and obtained from the coupling of aminoazotoluene to 4-aceto-1-naphthol was dispersed in water using a lignin sulfonate dispersing agent. 20 ml. of this dispersion (15% A.I.) was diluted with water and 20 ml. of a 2:1 mixture of di- and triethylene glycol diacetates to give a dyebath volume of 100 ml. A blended twill fabric of 50% cotton and 50% nylon was padded with the above dyebath and subsequently heated at 200° C. for 2.5 minutes. The dyed fabric was scoured in 2% oleate soap solution at 90° C. for 15 minutes and the resulting ruby red dyeing had a solid appearance and good wetfastness. A substantial amount of solvent was retained by the fabric, at least in the cotton portion thereof, throughout the heat treatment.

EXAMPLE 9

A cotton fabric was padded to about 70% pickup with a padbath prepared by diluting 44 grams of a dyepaste containing 17.8% by weight 1-benzoylamino-4-anilino-anthraquinone, O.A. 0.2, to 500 ml. with water and mixing into the dispersion 10 grams of purified vegetable gum ("Superclear" 100N). The cloth was then dried in a low-temperature oven and stored under conditions such that it came to equilibrium absorption of moisture from the ambient atmosphere. Portions of this dry cloth were overpadded to about 70% pickup with mixtures of water and the dye solvents listed in Table III at the concentrations indicated. The wet fabrics were heated in an oven at the temperatures and for the times indicated in Table III. The fabrics were scoured in water containing an etheralcohol sulfate detergent ("Duponol" RA) at about 90° C. for five minutes, dried and then scoured in tetrachloroethylene at about 50° C. for five minutes and dried. A blue dyeing was obtained in all cases.

Scouring the padded and dried fabric without heating in the presence of water and a dye solvent resulted in essentially complete removal of dye, leaving the fabric no more than slightly stained.

TABLE III

| Dyeing | Dye solvent | Percent solvent in water | Heating temperature, °C. | Heating time, minutes |
|---|---|---|---|---|
| 9 A | Polyethylene glycol, m.w. 300 | 10 | 210 | 2 |
| 9 B | Polyethylene glycol, m.w. 400 | 10 | 210 | 2 |
| 9 C | Polyethylene glycol, m.w. 600 | 10 | 220 | 4 |
| 9 D | Polyethylene glycol, m.w. 1,000 | 10 | 220 | 4 |
| 9 E | Polyethylene glycol, m.w. 1,500 | 10 | 220 | 4 |
| 9 F | Polyethylene glycol, m.w. 4,000 | 10 | 220 | 4 |
| 9 G | Polyethylene glycol, m.w. 6,000 | 10 | 220 | 4 |
| 9 H | Polypropylene glycol, m.w. 425 | 10 | 220 | 4 |
| 9 I | Pentaerythritol condensed with propylene oxide, m.w. 500 (A). | 10 | 220 | 2 |
| 9 J | Sorbitol condensed with propylene oxide, m.w. 530 (B). | 10 | 220 | 2 |
| 9 K | Sorbitol condensed with propylene oxide, m.w. 760 (C). | 10 | 220 | 2 |
| 9 L | Sorbitol condensed with propylene oxide, m.w. 555 (D). | 10 | 220 | 2 |
| 9 M | Sorbitol condensed with propylene oxide, m.w. 750 (E). | 10 | 220 | 2 |
| 9 N | Polypropylene oxide m.w. 1,750 condensed with ethylene oxide to 40% ethylene oxide content (F). | 10 | 220 | 4 |
| 9 O | Ethylene diamine condensed with propylene oxide to m.w. 1,500-2,000 and then with ethylene oxide to 40-44% ethylene oxide content (G). | 10 | 220 | 4 |

NOTE.—(A)="Pluracol" PEP 550 Tetrol; (B)=Atlas G2406 Hexol; (C)=Atlas G2407 Hexol; (D)=Atlas G2566 Hexol; (E)=Atlas G2571 Hexol; (F)="Pluronic" L64; (G)="Tetronih" 504.

EXAMPLE 10

A portion of the padded and dried cotton fabric of Example 9 was overpadded with an emulsion of 10 grams of beta-phonoxyethanol, 78 grams of water, and 2 grams of an ethylene oxide condensation product surfactant. The wet fabric was heated for two minutes in an oven at 220° C. and then scoured with water and tetrachloroethylene as described in Example 9. A strong blue dyeing was obtained.

EXAMPLE 11

A poplin fabric containing 65% polyester and 35% cotton fibers was padded with a mixture of 0.75 gram of 2 - phenyl - 6(para - toluidino) - 3H - anthrapyrimidine, O.A. <2, in 80 ml. of trichloroethylene and 20 ml. of beta-phenoxyethanol. The fabric was dried for about 5 minutes at room temperature to permit evaporation of trichloroethylene and was then placed for two minutes in an oven containing water vapor at about 125° C. The resulting fabric was placed for two minutes in an oven at 215° C., rinsed with warm water, scoured at 80° C. for 10 minutes in water containing an ether-alcohol sulfate detergent ("Duponol" RA), and finally, scoured with tetrachloroethylene at 50° C. for 10 minutes. Both cotton and polyester fibers were dyed.

EXAMPLE 12

A continuous length of cotton poplin weighing about 5.5 ounces per square yard was padded to about 60% pickup with a padbath containing water, 100 grams per liter of a dyepaste containing 15% by weight of 1-benzoylamino - 4 - anilinoanthraquinone, O.A. 0.2, 20 grams per liter of refined natural gums ("Superclear" 100N), and 200 grams per liter of triethyleneglycol diacetate. The padded cloth was passed at a rate of 2 yards per minute between banks of infra-red lamps, with three lamps of 1000 watts each shining at intervals of about 4 inches on each surface perpendicular to the fabric from a distance of about 3 inches. The heated fabric was dry to the touch. Scouring a portion of the heated fabric at about 80° C. in a 1% aqueous solution of an ether-alcohol sulfate detergent ("Duponol" RA) left the fabric dyed blue. Scouring a similar portion of the padded but unheated fabric resulted in removal from the fabric of essentially all the dye, leaving it only slightly stained.

EXAMPLE 13

An azo dye was prepared by coupling C.I. Azoic Diazo Component 135 to C.I. Azoic Coupling Component 18 (C.I. 37520). This dye was converted into a cobalt complex by reaction with cobalt acetate in a mixture of ethylene glycol and acetic acid. The metallized dye, O.A. 0.5, was isolated and milled with sand and a lignin sulfonate dispersant as described in Example 1. The resulting aqueous dyepaste was standardized to 10% active ingredient. A dyebath was prepared containing 10 ml. of the dyepaste, 10 ml. of triethyleneglycol diacetate and 30 ml. of water. A cotton jean cloth was padded with this dyebath to a pickup of about 60%. The padded fabric was placed for three minutes in an oven at 205° C. After an aqueous scour, the fabric was dyed uniformly green and had good washfastness and lightfastness.

Similar results were obtained with a twill fabric containing cotton and nylon fibers.

A gray dyeing was obtained when the above azo dye was metallized with cupric acetate.

The azo dye prepared by coupling C.I. Azoic Diazo Component 136 to C.I. Azoic Coupling Component 12 (C.I. 37550), was metallized with cupric acetate, O.A. 0.7, and applied similarly to both cotton and nylon-cotton fabrics to obtain smooth brown dyeings with good washfastness and lightfastness.

EXAMPLE 14

(A) A cotton fabric was padded to about 70% pickup with an aqueous solution containing 200 grams per liter of polyethylene glycol (molecular weight 600) and 20 grams per liter of purified vegetable gum ("Superclear" 100N). The padded fabric was heated at 160° C. for five minutes to evaporate water, leaving the cotton fibers in a swollen state. The fabric was sprinkled with the powdered dye having an O.A. of 0.3 and obtained by coupling diazotized para-ethylaniline to Azoic Coupling Component 19. The fabric bearing the dye was heated at 160° C. for three minutes. A mottled red dyeing was obtained, with color in those portions where solid particles of dye contacted the fabric. The fabric was scoured as described in Example 9, and dried. The colored portions of the fabric retained their color.

Similar results were obtained when the dye used was 1,4-bis(p-ethoxyanilino)anthraquinone, O.A. <2.

(B) A swollen fabric prepared as in (A) was stored overnight and then printed in a pattern with a print paste prepared from 10 grams of a 1,4-bis-(ortho-ethoxyanilino)anthraquinone, O.A. 0.8, dyepaste (15 percent active ingredient), 30 grams of water, and 60 grams of purified natural gum ether thickener ("Polygum" 272). The printed fabric was heated at 180° C. for 1.7 minutes and scoured as in (A). The printed areas were strongly dyed. Another portion of the fabric, printed, heated and scoured without prior swelling with water in the presence of a solvent, retained only a slight stain after scouring.

(C) A swollen cotton fabric was prepared as in (A) using an aqueous solution containing 100 grams per liter of methoxypolyethylene glycol (molecular weight 350) and 20 grams per liter of purified vegetable gum. The swollen fabric was dipped into trichloroethylene containing 1 percent by weight of the azo dye obtained by coupling diazotized aminoazobenzene to phenyliminodiethanol dibenzoate, O.A. 0.1. The fabric was then heated at 160° C. for three minutes. An orange dyeing was obtained and it retained its color after scouring as in (A).

EXAMPLE 15

A mixture of 3.0 grams of C.I. Vat Orange 5, O.A. 0.1, and 300 ml. of butoxyacetoxydiethylene glycol was heated to 80° C., a piece of cotton jean cloth weighing 1.7 grams and wet with 2.0 grams of water was added, and the whole was heated to 140° C. over 2.5 hours. The cloth was rinsed with water and scoured as described in Example 9. The cloth was dyed orange, but cloth was only slightly stained when the procedure was repeated without the water.

The embodiments of the invention in which an exclusive property or privilege is claimed is defined as follows:

1. The process for dyeing water swellable cellulosic materials which increase in size and flexibility upon exposure to water, at high utilization of dye, with a colored, preformed, high molecular weight disperse dye which has limited water solubility and does not require oxidation, reduction, hydrolysis or other chemical modification for fixation or development of color, which process comprises:

(A) contacting the water swellable cellulosic material in any sequence, including simultaneously, at a temperature of 0–225° C., with:
   (1) water in an amount sufficient to swell the cellosic material;
   (2) a colored, preformed, high molecular weight disperse dye in an amount sufficient to color the cellulosic material, a boiling saturated solution of which dye in 0.1 Molar aqueous sodium carbonate exhibits an optical absorbance of 0–2 as calculated from the spectrophotometrically-determined optical absorbance of the solution obtained by diluting the saturated solution ten-fold with a 90/10 mixture, by volume, of triethylene glycol dimethyl ether and water and then cooling to room temperature; and
   (3) a solvent in an amount sufficient to maintain swelling of the cellulose if water is removed, and which
      (a) is at least 2.5 weight percent soluble in water at 25° C.
      (b) boils above about 150° C. at atmospheric pressure,
      (c) is a solvent for the dye at some temperature in the range of about 0° to 225° C.,
      (d) has the formula

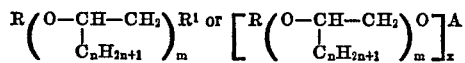

wherein
   $n$ is 0 or 1;
   $m$ is a positive whole number no greater than 25;
   R is H, $C_{1-8}$ alkyl, $C_{7-15}$ aralkyl or alkaryl,

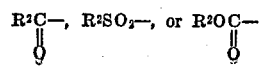

R1 is —OH, —OR², —SR², —NHR², —NR²($C_{1-8}$ alkyl), —NR²($C_{7-15}$ aralkyl or alkaryl),

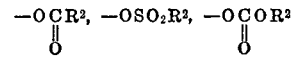

—NH(phenyl), or —NH(naphthyl);
R² is $C_{1-8}$ alkyl, $C_{5-10}$ cycloalkyl, $C_{7-15}$ aralkyl or alkaryl, $C_6$ aryl, $C_{10}$ aryl, or furfuryl;
$x$ is the number of unsatisfied valencies in A; and A is ROCH₂CHORCH₂—,

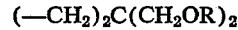

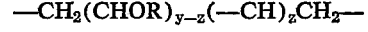

in which $y$ is 2, 3 or 4 and $z$ is 0, 1, 2, 3 or 4 but no greater than $y$; and (e) if R is H or $C_{1-8}$ alkyl and R¹ is OH, has a molecular weight of at least 300;

provided, however, that if the cellulosic material is contacted simultaneously with water and solvent, the water is 10 to 95 weight percent and the solvent is 5 to 90 weight percent of the combined water-solvent weights;

(B) while maintaining the cellulosic material from (A) in its swollen state, contacting same throughout with a solution of the preformed dye in solvent or solvent-water;

(C) fixing said preformed dye throughout the cellulosic material by precipitating same; and (D) recovering uniformly dyed cellulosic material which is fast to aqueous washing and organic solvent drycleaning.

2. The process of claim 1 wherein the cellulosic material is cotton, regenerated cellulose or wood pulp and wherein the solution of the preformed dye in solvent or solvent-water is obtained by employing an elevated temperature.

3. The process of claim 1 wherein the solution of the preformed dye in solvent or solvent-water is obtained by reducing the proportion of water to dye solvent.

4. The process of claim 1 wherein the solution of the preformed dye in solvent or solvent-water is obtained by adding an auxiliary solvent which is a halogenated hydrocarbon having an atmospheric pressure boiling point of less than about 130° C.

5. The process of claim 1 wherein said dye exhibits an optical absorbance of less than about 0.2

6. The process of claim 2 wherein there is applied to the cellulosic material sufficient water and dye solvent to provide at least about 10 weight percent water and about 3 to 60 weight percent dye solvent, based on the dry weight of cellulosic material.

7. The process of claim 2 wherein the dye is an amino-substituted anthraquinone or a monoazo or bisazo dye.

8. The process of claim 2 wherein the dye solvent is a polyol or an ester or ether derivative thereof, which solvent is completely miscible with water at dyeing conditions.

9. The process of claim 8 wherein the dye solvent is a polyethylene glycol or an ester or ether derivative thereof.

10. The process of claim 8 wherein the water, dye solvent and dye are contacted with the cellulosic material simultaneously.

11. The process of claim 9 wherein the dye solvent is a polyethylene glycol having a molecular weight or about 300–600 or a monomethyl ether of a polyethylene glycol having a molecular weight of about 300–600.

12. The process of claim 10 wherein the dye is applied by printing.

13. The process of claim 10 wherein cotton fibers are:
(A) impregnated in a dye bath mixture comprising
  (1) about 10 to 95 weight percent water and
  (2) about 5 to 90 weight percent of a solvent which is miscible with water at the dyeing conditions,
said dye being essentially insoluble in boiling 0.1 Molar aqueous sodium carbonate and soluble in the dye solvent at a temperature from about 125° to 225° C.; and
(B) heated to 125° to 225° C.

14. The process of claim 13 wherein the cotton fibers, after dyeing, are scoured with an aqueous detergent solution.

15. The process of claim 10 wherein cotton fibers are:
(A) impregnated in a dye bath mixture comprising
  (1) about 10 to 95 weight percent water and
  (2) about 5 to 90 weight percent of a solvent which is miscible with water at the dyeing conditions,
said dye being soluble in the dye solvent at a temperature from about 125° to 225° C., said dye exhibiting an optical absorbance of less than about 0.2; and
(B) heated to 125° to 225° C.

16. The process of claim 15 wherein the cotton fibers, after dyeing, are scoured with an aqueous detergent solution.

17. The process of claim 1 wherein the water, dye solvent and dye are contacted with the cellulosic material in at least two steps.

18. The process of claim 17 wherein water, dye solvent and dye are contacted with the cellulosic material in three steps.

19. The process of claim 17 wherein dye and water are contacted with the cellulosic material in one step and dye solvent is contacted with the cellulosic material in another step.

20. The process of claim 17 wherein dye and dye solvent are contacted with the cellulosic material in one step and water is contacted with the cellulosic material in another step.

21. The process of claim 17 wherein water and dye solvent are contacted with the cellulosic material in one step, dye is contacted with the cellulosic material in another step, and the swollen cellulosic material is contacted with said dye solution at 125° to 225° C.

22. The process of claim 20 wherein dye and dye solvent are as a solution in an auxiliary solvent which is a halogenated hydrocarbon having an atmospheric pressure boiling point of less than about 130° C.

23. The process of claim 21 wherein the dye is applied by printing.

24. The process of claim 23 wherein the cellulosic material, after dyeing, is secured with an aqueous detergent solution.

25. The process of claim 1 wherein the water swellable cellulosic material is admixed or blended with a synthetic material.

26. The process of claim 25 wherein the cellulosic material is cotton and the synthetic material is polyester or polyamide.

27. The process of claim 25 wherein there is applied to the blend or mixture sufficient water and dye solvent to provide at least about 10 weight percent water, based on the dry cellulosic component, and about 3 to 60 weight percent dye solvent, based on the dry blend.

28. The process of claim 25 wherein the dye is an amino-substituted anthraquinone or a monoazo or bisazo dye.

29. The process of claim 25 wherein the solution of the preformed dye in solvent or solvent-water is obtained by employing an elevated temperature.

30. The process of claim 25 wherein the solution of the preformed dye in solvent or solvent-water is obtained by reducing the proportion of water to dye solvent.

31. The process of claim 25 wherein the solution of the preformed dye in solvent or solvent-water is obtained by adding an auxiliary solvent which is a halogenated hydrocarbon having an atmospheric pressure boiling point of less than about 130° C.

32. The process of claim 26 wherein the cotton comprises 20 to 35 weight percent, and the synthetic material is polyester and comprises 65 to 80 weight percent, of the blend or mixture.

33. The process of claim 26 wherein the blend or mixture is contacted with dye, water and dye solvent and then heated, first at a temperature sufficient to effect dyeing of the cotton but not the synthetic material, and thereafter at a temperature sufficient to effect dyeing of the synthetic material but not in excess of about 225° C.

34. The process of claim 26 wherein the blend or mixture is contacted with dye and heated at a temperature sufficient to effect dyeing of the synthetic material, and then, contacted with dye, dye solvent and water at a temperature sufficient to effect dyeing of the cotton, both the aforesaid temperatures being not in excess of about 225° C.

35. The process of claim 26 wherein the same dye is used to dye the cotton and the synthetic material.

36. The process of claim 25 wherein the dye solvent is a polyol or an ester or ether derivative thereof, which solvent is completely miscible with water at dyeing conditions.

37. The process of claim 36 wherein the dye solvent is a polyethylene glycol or an ester or ether derivative thereof.

38. The process of claim 36 wherein the water, dye solvent and dye are contacted with the blend or mixture simultaneously.

39. The process of claim 36 wherein the water, dye solvent and dye are contacted with the blend or mixture in at least two steps and the swollen cellulosic material is contacted with said dye solution at 125° to 225° C.

40. The process of claim 39 wherein the dye is applied by printing.

41. The process of claim 40 wherein the blend or mixture, after dyeing, is scoured with an aqueous detergent solution.

42. The process of claim 38 wherein the blend or mixture is:
(A) impregnated in a dye bath mixture comprising
  (1) about 10 to 95 weight percent water and
  (2) about 5 to 90 weight percent of a solvent which is miscible with water at the dyeing conditions,
said dye being essentially insoluble in boiling 0.1 Molar aqueous sodium carbonate and soluble in the dye solvent at a temperature from about 125° to 225° C.; and
(B) heated to 125° to 225° C.

43. The process of claim 42 wherein the blend or mixture, after dyeing, is scoured with an aqueous detergent solution.

44. The process of claim 38 wherein the blend or mixture is:
(A) impregnated in a dye bath mixture comprising
  (1) about 10 to 95 weight percent and
  (2) about 5 to 90 weight percent of a solvent which is miscible with water at the dyeing conditions, said dye being soluble in the dye solvent at a temperature from about 125° to 225° C., said dye exhibiting an optical absorbance of less than about 0.2; and (B) heated to 125° to 225° C.

45. The process of claim 44 wherein the blend or mixture, after dyeing, is scoured with an aqueous detergent solution.

References Cited

UNITED STATES PATENTS

| | | | |
|---|---|---|---|
| 2,828,180 | 3/1958 | Sertorio | 8—62 |
| 2,120,552 | 6/1938 | Ellis et al. | 8—173 |

FOREIGN PATENTS

| | | |
|---|---|---|
| 1,070,074 | 5/1967 | Great Britain. |
| 894,338 | 4/1962 | Great Britain. |
| 988,046 | 3/1965 | Great Britain. |

OTHER REFERENCES

Cockett: Dying of Cellulosic Fibres and Related Process, 1961, p. 291.

Solven: American Dyestuff Reporter, Aug. 22, 1960, pp. 600–605.

Schober et al.: American Dyestuff Reporter, May 25, 1964, pp. 418–420.

W. Koch et al.: Whittaker's Dyeing With Coal Tar Dyestuffs, 1964, pp. 244–245.

DONALD LEVY, Primary Examiner

U.S. Cl. X.R.

8—21 R, 41 R, 39, 41 C, 173, 174, 93